United States Patent
Hirao et al.

(10) Patent No.: US 8,342,695 B2
(45) Date of Patent: Jan. 1, 2013

(54) HIGH PRESSURE DISCHARGE LAMP LIGHTING APPARATUS AND PROJECTOR

(75) Inventors: Tetsuji Hirao, Hyogo (JP); Masaaki Uehara, Hyogo (JP); Atsushi Imamura, Hyogo (JP); Koji Yamada, Hyogo (JP); Hirohisa Iwabayashi, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 289 days.

(21) Appl. No.: 12/923,185

(22) Filed: Sep. 8, 2010

(65) Prior Publication Data

US 2011/0063584 A1 Mar. 17, 2011

(30) Foreign Application Priority Data

Sep. 11, 2009 (JP) ................. 2009-210250

(51) Int. Cl.
*G03B 21/20* (2006.01)
*H05B 41/16* (2006.01)
*H05B 37/02* (2006.01)

(52) U.S. Cl. .......... 353/85; 315/287; 315/291; 315/307; 315/360

(58) Field of Classification Search ............... 353/85, 353/122; 315/287, 291, 307, 360
See application file for complete search history.

(56) References Cited

U.S. PATENT DOCUMENTS

| 5,109,181 | A | 4/1992 | Fischer et al. |
| 7,170,237 | B2 * | 1/2007 | Suzuki et al. ............ 315/246 |
| 8,067,903 | B2 * | 11/2011 | Deppe et al. ............ 315/307 |
| 2005/0162103 | A1 | 7/2005 | Deurloo |
| 2006/0022613 | A1 | 2/2006 | Suzuki et al. |
| 2009/0051300 | A1 | 2/2009 | Deppe et al. |

FOREIGN PATENT DOCUMENTS

| JP | 02-148561 A | 6/1990 |
| JP | 2000-131668 A | 5/2000 |
| JP | 2003-330115 A | 11/2003 |
| JP | 2004-151489 A | 5/2004 |
| JP | 2005-522818 A | 7/2005 |
| JP | 2006-332015 A | 12/2006 |
| JP | 2009-158238 A | 7/2009 |
| JP | 2009-527871 A | 7/2009 |

OTHER PUBLICATIONS

Office Action from Japanese Patent Office for 2009-210250 dated Jul. 5, 2011.

* cited by examiner

*Primary Examiner* — Georgia Y Epps
*Assistant Examiner* — Magda Cruz
(74) *Attorney, Agent, or Firm* — Rader, Fishman & Grauer PLLC

(57) ABSTRACT

A discharge lamp lighting apparatus comprises a discharge lamp and a power supply the discharge lamp can be switched between a steady power lighting mode, which drives the discharge lamp by an alternating current in which first and second polarities are repeated by turns, and a low power lighting mode, which drives the discharge lamp at 50% or less of the alternating current of the steady power lighting mode, and the alternating current comprises a first time unit, which has a time width t1, and second time unit, which has a time width t2, that are repeated by turns to drive the discharge lamp.

7 Claims, 9 Drawing Sheets

HIGH PRESSURE DISCHARGE LAMP LIGHTING APPARATUS AND PROJECTOR

CROSS-REFERENCES TO RELATED APPLICATION

This application claims priority from Japanese Patent Application Serial No. 2009-210250 filed Sep. 11, 2009, the contents of which are incorporated herein by reference in their entirety.

TECHNICAL FIELD

The present invention relates to a high pressure discharge lamp lighting apparatus, and a projector that is equipped with the high pressure discharge lamp lighting apparatus. The present invention especially relates to a high pressure discharge lamp lighting apparatus comprising a high pressure discharge lamp in which an arc tube encloses 0.15 mg/mm$^3$ or more of mercury and the mercury vapor pressure at time of lighting is high, for example 11 MPa or more. The present invention further relates to a projector that is equipped with the high pressure discharge lamp, wherein the discharge lamp is suitably used as a projection light source for a projector apparatus, rear projection television, etc.

BACKGROUND

In a projection type projector apparatus, an image with sufficient color rendering property is required to be uniformly projected onto a rectangle screen. For this reason, a metal halide lamp, in which enclosing mercury or metal halide, is used as a light source. Moreover, in recent years, advancements in and miniaturization of a point light source has put lamps with electrodes that have a very short distance between into practical use. In these situations, a high pressure discharge lamp with very high mercury vapor pressure, for example, 20 MPa or more, has been recently used, instead of a metal halide lamp. This lamp is designed to limit an arc spread and to improve an optical output by increasing the mercury vapor pressure.

A high pressure discharge lamp is used as such a lamp, in which a pair of electrodes is arranged in an arc tube made of silica glass, so as to face each other at an interval of 2 mm or less, and in which an arc tube encloses mercury of 0.15 mg/mm$^3$ or more, rare gas, and halogen in a range of $10^{-6}$ μmol/mm$^3$ to $10^{-2}$ μmol/mm$^3$, (for example, refer to Japanese Patent Application Publication No. H02-148561). Japanese Patent Application Publication No. 2009-527871 discloses such a kind of discharge lamp and a lighting device. Japanese Patent Application Publication No. 2000-131668 discloses a high pressure discharge lamp in which mercury vapor pressure of the inside of the arc tube at time of steady power lighting is 15 MPa-35 MPa, and a halogen substance in a range of $10^{-6}$ μmol/mm$^3$ to $10^{-2}$ μmol/mm$^3$ is enclosed in an arc tube, wherein a pair of electrodes is provided in an arc tube and a projection portion is formed around the center of the tip of the electrode, so as to prevent an arc jump phenomenon, in which the position of an electric discharge arc generated between the electrodes is not stabilized and moves around the central part or the circumference part of the tip of the electrode. Alternating current voltage is impressed between the pair of electrodes so as to light the lamp by a lighting apparatus comprising a DC/DC converter, a DC/AC inverter and a high voltage generating apparatus.

On the other hand, since projectors are getting miniaturized in recent years and are becoming home standards, it is necessary to consider a screen brightness relative to the environment in use and a projected image. A projector, which has a function called a modulated light function, is invented in order to meet such demands (for example, Japanese Patent Application Publication No. 2000-131668). Here, in the modulated light function, the brightness of a high pressure discharge lamp is adjusted so that electric power consumption is reduced by lighting the high pressure discharge lamp with electric power lower than the rated power. Hereinafter, the lamp lighting with electric power lower than the rated power is referred to as a "modulated light power lighting." In general, existing high pressure discharge lamp lighting apparatuses have both the "rated power lighting" function and the "modulated light power lighting" function. In the present specification, lighting including "rated power lighting" and "modulated light power lighting" is defined as "steady power lighting."

Moreover, the "modulated light power lighting" is generally operated with 60-80% of electric power in the "rated power lighting." FIG. 5 shows an example of a waveform of current, in case where a high pressure discharge lamp is lighted by a lighting apparatus having a modulated light function. As shown in the figure, when a modulated light power lighting command signal becomes ON while the rated power lighting is carried out, the high pressure discharge lamp is lighted by electric power, which is decreased to approximately 60 to 80% of that in the rated power lighting.

In recent years, for example, a projector with a function called an "AV mute" has been also invented, in which when an image projection to a screen itself is not needed, the projection is not carried out temporarily. Since the internal pressure of the discharge lamp having such a function is high immediately after the discharge lamp is turned off, the discharge lamp cannot be re-lighted at that time. Therefore, in order to respond thereto, light to be projected on the screen is blocked by shuttering it mechanically or adjusting voltage applied to a liquid crystal panel. Lighting of a lamp in a state where an image is not intentionally projected on a screen, is defined as "low power lighting".

It is desirable that the electric power in such low power lighting be as low as possible. By performing lighting by the utmost low power, heat generated from the lamp is remarkably reduced, so that it is possible to stop driving a cooling fan or to reduce the speed of the cooling fan, which is a principal cause of a noise from the projector, whereby the noise from the projector can be lowered to the utmost level. Furthermore, since the thermal load of the lamp can be reduced by lighting the lamp at low electric power, it is possible to substantially extend a life span of the lamp by combining the case where the image projection is required with the case where the projection is not required. The "thermal load of the lamp" means a thermal load to an arc tube and electrodes, and they can be reduced by lowering applied power.

Moreover, a contrast ratio is one of performances of a projector. The contrast ratio is a ratio of the luminance in a white state (bright state) on a projected screen and that in a state of black (dark state) on the projected screen. Since an image whose brightness and darkness are clearly shown can be projected when the contrast ratio is high, it is considered as an important performance of the projector in addition to brightness. The technology (for example, an iris function), in which a state of black is created by, for example, providing the above-mentioned mechanical shutter function in order to make a contrast ratio high, is adopted. As described above, there is a demand on a high pressure mercury lamp in which while a certain brightness or more is required in case of the rated power, the modulated light power lighting can be carried out, and further the low power lighting, in which modulated light power is extremely limited, can be carried out.

As described above, although there is a demand on a high pressure mercury lamp capable of performing low power lighting, in which electric power is extremely limited, a problem set forth below occurs, when it is used at greatly lowered electric power while a rectangle wave alternating current is supplied. Japanese Patent Application Publication No. 2006-332015 discloses that, in this kind of high pressure mercury lamp, a projection is formed at a tip portion of an electrode during lighting, whereby arc electric discharge can be stably formed, wherein the projection serves as a starting point form. According to Japanese Patent Application Publication No. 2006-332015, a projection which serves as a starting point of an arc, is maintained by changing steady frequency, and low (cycle) frequency, which is intermittently (periodically) inserted, or the number of waves, according to lamp voltage or lamp lighting electric power, so that a stable operation can be performed.

However, when a high pressure discharge lamp whose rated power was 180 W, was turned on at 90 W according to the above-mentioned technology, an arc luminescent spot was not stabilized at any combination of frequencies, so that a flicker phenomenon and a lamp "light-out" often occurred. Specifically, where electric power of 70 W or less is applied when the rated power is 180 W a flicker remarkably occurs, and, in case of 30 W or less, lamp light-out occurs.

SUMMARY

It is an object of the present invention to offer a projector equipped with a lighting device and a high pressure discharge lamp lighting apparatus, wherein even in a low power lighting mode in which electric power for lamp lighting is very low, and a lamp is driven with a power value of 50% or less of the rated power consumption, an arc luminescent spot of the discharge lamp is stabilized in position, so that the so-called flicker is prevented and deformation of electrodes is controlled, whereby a lighting operation in a screen projection mode is not affected, an operation is stably performed with very low electric power and lighting without light-out of the lamp when shifting to a steady power lighting mode from the low electric power mode is performed.

DESCRIPTION

In cases where an operation is performed at an electric power still lower than the modulated lighting electric power of the prior art, the arc luminescent spot portion was observed while electric power was gradually reduced, in order to observe how the flicker phenomenon occurred in an alternating current drive operation. For example, when electric power applied to the lamp, which was lighted at the rated power of 180 W, was gradually changed, if frequency was the same as that in the rated power operation (hereinafter referred to as rated frequency), it was found out that a projection portion, which formed the luminescent spot portion, was deformed at 140 W. Furthermore, based on Japanese Application Publication No. 2006-332015, the frequency, at which lighting was performed stably as low as 130 W, could be found, when frequency lower than the rated operation frequency is selected as operational frequency in modulated lighting (hereinafter referred to as modulated lighting frequency), and further the lower frequency intermittently is inserted therein. However, it was found that the projection was deformed even though any frequency was selected when the electric power was further lowered.

Figure 3A:
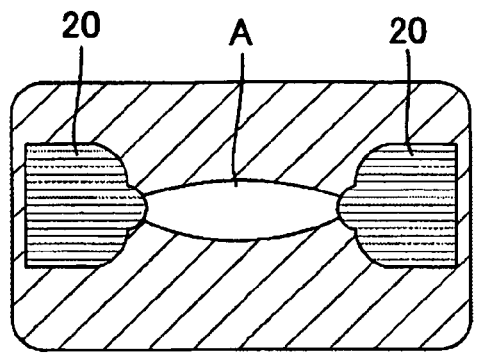
FIGS. 3A, 3B, 3C and 3D show states of deformation of an electrode projection of a high pressure discharge lamp.

Description about the deformation of this projection portion will be given below, referring to FIGS. 3A through 3D. FIGS. 3A though 3D are schematic diagrams of an arc tube portion of a high pressure discharge lamp, wherein an arc A is formed between electrodes 20. An arc tube encloses halogen so that a halogen cycle may be facilitated when a high pressure discharge lamp is lighted at the rated power, to suppress an arc tube blackening phenomenon in which tungsten, which is a forming material, evaporates due to heat at time of lighting, and adheres to a tube wall of the arc tube. The evaporated tungsten combines with halogen, and when it comes back to the arc plasma by a convection flow and is ionized there, it becomes a cation. The tungsten, which has become the cation, is pulled to an area centering on an arc spot, which is the electric field concentrating point of the tip of the electrode in a side of a cathode phase, and is deposited there. Next, if the phase of the electrode is reversed to an anode phase, the tungsten at the tip of the electrode that has been deposited in the cathode phase evaporates again since electrons collide with the tip of the electrode entirely so that the temperature thereof rises.

Figure 3B:
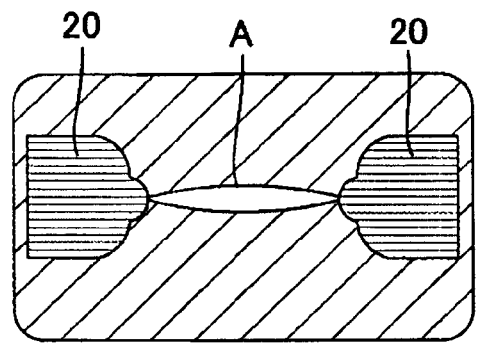
Figure 3C:
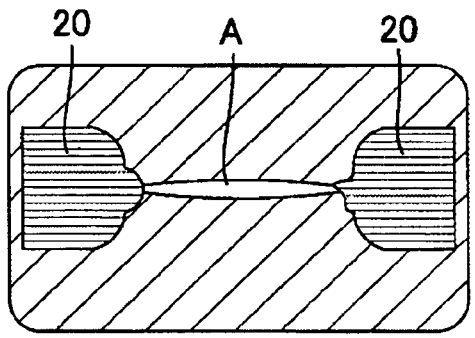
Figure 3D:
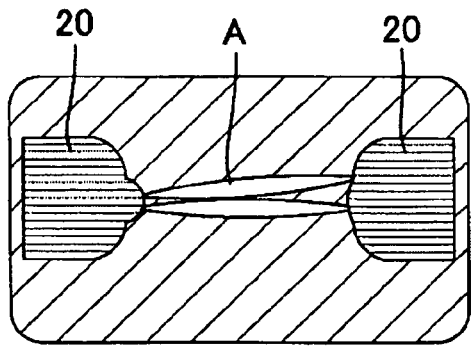

The deposition and the evaporation thereof is balanced so that the moderate projection is stably maintained at the tip of the electrode at time of the rated power lighting (FIG. 3A). However, since the temperature of the tip portion of the electrode in the cathode phase state becomes lower than that at time of the rated power lighting when it is lighted by electric power lower than the rated power at time of a modulated lighting operation, i.e., when it is lighted at electric power lower than the rated power, the arc spot, which is the concentration point of the electric field at the tip of the electrode, is limited to part of the projection tip (FIG. 3B). That is, in the projection portion, there is a point at which an electric field tends to be concentrated and a point at which it does not. Since such an arc spot portion is very high in temperature, even when it is a cathode phase, the tungsten evaporates so that the shape changes (FIG. 3C). The arc spot portion drops in temperature, depending on the deformed shape, so that it moves to a portion where an arc spot tends to be formed (FIG. 3D). It is considered that the shape of the projection changes so as to be a trapezoid when such phenomenon is repeated so that an arc jump is repeated, whereby it may be recognized as a flicker on a projection screen.

Based on this view point, in order to avoid such phenomenon, it is effective to insert low frequency intermittently and raise the temperature at the tip of the electrode. It can be easily assumed that the electrode temperature can be raised more by increasing the number of the waves to be inserted. However, in case of an alternating current drive, since an anode phase in which electrode temperature surely rises, and a cathode phase in which it drops, occur by turns, it would appear that there is a limit in temperature rise. Furthermore, when frequency of the low frequency operation is made too low (for example, approximately 10 Hz), a flicker phenomenon occurs. The flicker phenomenon is another phenomenon in which, when the polarity is reversed, change of current is viewed as blinking on the projected screen.

When electric power was decreased to approximately 30 W, it was checked how a lamp light-out phenomenon would occur. Although the lamp was lighted without any problem immediately after the electric power was changed from the steady lighting to the low power lighting, the lamp light-out phenomenon occurred after approximately 10 seconds. When the lamp voltage was checked, it turned out that the lamp voltage went up to approximately 200 V, so that a ballast circuit determined it was abnormal voltage, and turned off the lamp. On the other hand, when the appearance of the electrode was observed, it turned out that thermal electrons could not be emitted since the temperature of the electrode became very low, so that the so-called glow discharge, in which electric discharge was carried out all over the electrode, continued. It turned out that lamp voltage in the glow discharge was higher than that in the arc electric discharge, in which electric discharge occurred in general at the projection formed at the tip portion of the electrode, so that the voltage reached approximately 150-200 V.

Figure 4A:
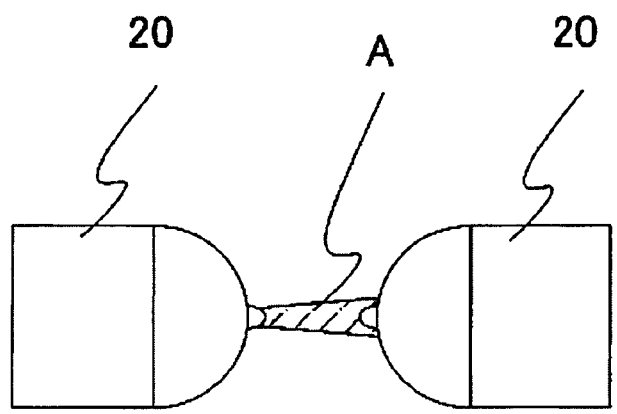
FIGS. 4A, 4B and 4C show states of deformation of an electrode projection in a low power lighting mode.
Figure 4B:
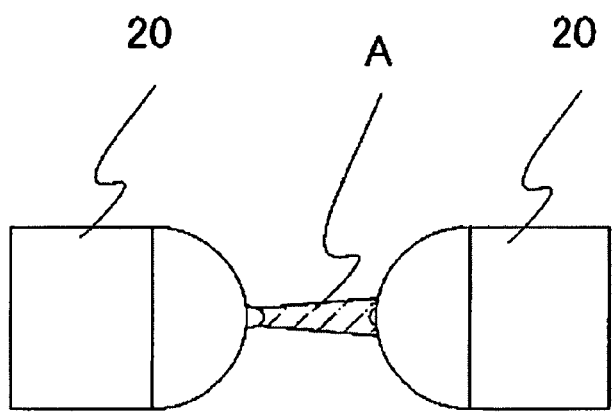
Figure 4C:
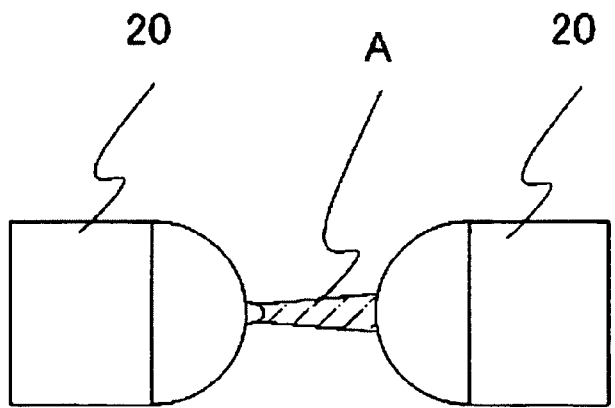

Next, how the light-out phenomenon occurred when shifting to the steady power lighting mode from the low power lighting mode was checked. In a short period, such as five minutes, after shifting from the steady power lighting mode, no significant change to the electrode projection, at which an anode operation was carried out, was observed. The situation is shown in FIG. 4A. When it exceeded five minutes, and passed over one hour, as shown in FIG. 4B, the projection wore out to become round and small. Furthermore, when leaving it for twenty hours or more, the projection disappeared as shown in FIG. 4C. Unless it was intentionally left in the small electric power lighting mode for a long time, it was not turned into the state shown in FIG. 4C. That is, the lamp light-out, which occurred when shifting to the steady power lighting mode from the low power lighting mode, occurred in the state of the electrode shown in FIG. 4C. Therefore, it is thought that the light-out that occurred when shifting from the low power lighting mode to the steady power lighting mode was a cause of consumption of an electrode projection and the temperature drop in an anode operation, and when shifting to the cathode operation, the temperature of the electrode projection is too low so that discharge current could not be maintained thereby causing the light-out. As mentioned above, the present inventors identified the causes of the flicker phenomenon and the light-out of the lamp, which were generated when the modulated light power was very low. In examination of how to solve these problems, in addition to the problem of the light-out, which occurred when shifting from the low power lighting mode to the steady state power mode, a lighting method of the high pressure discharge lamp according to the present invention was conceived.

That is, an object of the present invention is attained by a high pressure discharge lamp lighting method, in which a high pressure discharge lamp lighting apparatus comprises a high pressure discharge lamp having a pair of electrodes arranged to face each other at a distance is 2 mm or less, the volume of which is almost equal to that of a silica glass electric discharge container, mercury of 0.15 mg/mm$^3$ or more, halogen in a range of $10^{-6}$ μmol/mm$^3$ to $10^{-2}$ μmol/mm$^3$, and a certain amount of rare gas are enclosed in the electric discharge container; and a power supply apparatus that supplies rectangle wave alternating current to the discharge lamp thereby lighting the discharge lamp. In the high pressure discharge lamp lighting method, except an initial lighting period that is immediately after start-up of the apparatus, when an operation is performed in a low power lighting mode in which the lamp is driven at a power value that is 50% or less of the rated power consumption, wherein a rectangle wave alternating current comprises a first time unit and a second time unit, and wherein the discharge lamp is driven by repeating the first and second time units, and the first time unit has a time width t1 and the second time unit is formed by repeating a time width t2, five times or more.

The mercury enclosed in the high pressure discharge lamp according to the present invention is 0.15 mg/mm$^3$ or more and when such a high pressure discharge lamp is lighted at 50% or less of electric power of the rated lighting, non-evaporated mercury remains, even if cooling is not performed at all. This is because originally the design of an arc tube capable of withstanding steady power lighting is determined to elicit specific performances, such as an illumination life span and brightness, but the arc tube does not reach the temperature at which the mercury evaporates, even under environment where no cooling is performed when 50% or less of the electric power is used. Conventionally, this is not desirable since the non-evaporated mercury is less effective on narrowing an electric discharge arc and an electric discharge starting point and the operation pressure also drops, so that an optical output drops. However, it is thought that when an operation is performed at 50% or less of electric power of the rated lighting, since the electric discharge arc and the electric discharge starting point, are not narrowed, it contributes to a role of maintaining electrode temperature at a constant level, thereby making it easy to carry out thermoelectronic emission of the electrode serves as a cathode.

Here, direct current lighting can be considered as a lighting method in which the polarity is fixed for a fixed time. Japanese Patent Application Publication No. 2005-522818 discloses a modulated lamp lighting method in which if a current is low then direct current lighting is performed.

According to Japanese Patent Application Publication No. 2005-522818, in the case of direct current lighting, an operation can be performed at a sufficiently low current, without light-out of the lamp. Then, this was confirmed by lighting the high pressure discharge lamp according to the present invention in the direct current lighting at a power value of 50% or less of the rated power consumption. In this case, it was confirmed that although the operation continued for approximately thirty minutes, the tip of an electrode that served as a cathode deformed, and after that, when the operation was switched back to a steady operation, the voltage rose greatly while the screen illumination dropped greatly. Moreover, light-out of the lamp occurred when the operation was switched to the steady lighting operation. Consideration was made on how this phenomenon occurred as set forth below. As disclosed in Japanese Patent Application Publication No. 2005-522818, since in the case of the direct current lighting, the temperature at the tip of the electrode served as a cathode was remarkably lower than that at time of a steady operation in case of alternating current lighting, the operation was performed in the so-called spot mode in which electric discharge occurred at only part of the tip of the electrode. Since the operation was stably performed in the spot mode, unlike the alternating current lighting, an arc spot did not move. However, a portion, which was used as the arc spot, was melted in a very narrow area, and became very high temperature. When the operation is performed for a short time, such as several seconds, there would have been no major impact, but if the lighting continued for a while, the portion used as the arc spot deformed. Next, when an operation was performed in the rated lighting as a steady lighting operation, for example, the deformed electrode tip could not withstand the current at time of the rated lighting, so that it further deformed and the voltage rose greatly.

Such a phenomenon may not occur in an HID lamp, in which a distance between electrodes is long, and the mercury density is low. However, as in the present invention, in the case of the high pressure discharge lamp in which the distance between electrodes is short. such as 2 mm or less, and the mercury enclosed is 0.15 mg/mm$^3$ or more, although there is non-evaporated mercury, since the arc is limited and the current density of the electrode tip portion cannot be ignored even though the current density is lower than that in the steady lighting operation, it is considered that concentration of the arc spot causes deformation of the electrode. Japanese Patent Application Publication No. 2009-527871, discloses that as to a supply of DC type voltage disclosed in Japanese Patent Application Publication No. 2005-522818, in a unit drive for supplying a generic AC type voltage, in which a semiconductor device is used in order to realize a full bridge circuit, if the supply of the DC type voltage continues by force, malfunction occurs. Furthermore, it discloses that even in the case of the drive unit, which supplies the common AC type voltage, DC type voltage is supplied to stably light a discharge lamp. However, it was confirmed that the "illumination instability" and "light-out" that are recognized in Japanese Patent Application Publication No. 2005-522818 still remain.

On the other hand, in the present invention, a first time unit of a rectangle wave alternating current in alternating current lighting has a time width t1, and a second time unit is formed by repetitions of a time width t2, wherein the time width t2 is repeated five times or more, so that an arc spot at the tip of an electrode that serves as a cathode is fixed, and further temperature of the tip of the electrode that serves as an anode can be kept proper since polarity thereof is reversed for a suitable period. Therefore, while the operation can be performed stably for a long time, light-out of the lamp, which may occur when the operation is shifted from a low power lighting mode to a steady power lighting mode, is suppressed.

When the time width t1 is 20 ms-500 ms and the time width t2 of the second time unit is 0.01 ms-5 ms, even in the case of the low power lighting mode in which the lamp is lighted at electric power value of 50% or less of rated power consumption, it is possible to suppress a flicker and to perform an operation stably. However, when a lamp is lighted over a long time, the electrode tip may deform slightly and the position of the projection of the tip portion may change (shift). Especially even if the time width t1 is 20 ms-500 ms and the time width t2 of the second time unit is 0.01 ms-5 ms, when the period of t1 and that of t2 are long, for example, when t2 is 5 ms and t2 is 500 ms, although the projection portion is melted in a very narrow area, the melted portion has a certain size, and the tip portion of the projection deforms slightly during prolonged lighting, and the position of the projection changes (shifts) gradually in the narrow area. In case where the distance between electrodes is longer than 2.0 mm, the distance of the slight shift of the projection position is not significant relatively. However, in case of the distance between electrodes is very short, such as 2.0 mm or less, shifting of the position of the projection begins to affect the screen illumination. Specifically, because of miniaturization of an LCD panel or DMD (digital mirror device), such slight deformation also influences prolonged use. From such a result, to further secure a long life span, the periods of t1 and that of t2 were more strictly examined. As a result, it turned out that when the time width t1 is 30 ms-100 ms and the time width t2 of the second time unit is 0.05 ms-1 ms, it is possible to stably maintain the tip portion of the electrode over a long time, without slight position shifting of the projection. Moreover, light-out of the lamp, which occurs when the operation is shifted from a low power lighting mode to a steady lighting mode, and the number of times of a repetition of the time width t2 of the second time unit, were examined. Consequently, incases of once (1 cycle) and 3 times (3 cycles), light-out could not be suppressed completely. By making the number of times of a repetition into five times or more, it was confirmed that the light-out could be controlled completely.

Objects of the present invention are attained as set fort below.

(1) A high pressure discharge lamp lighting apparatus comprising: a high pressure discharge lamp comprising: a silica glass electric discharge container enclosing a first electrode arranged to face a second electrode at an interval of 2 mm or less, and 0.15 mg/mm$^3$ or more of mercury, rare gas, and halogen in a range of $10^{-6}$ μmol/mm$^3$ to $10^{-2}$ μmol/mm$^3$; and a power supply apparatus that supplies a rectangle wave alternating current to the high pressure discharge lamp, wherein the high pressure discharge lamp has a steady power lighting mode and a low power lighting mode, wherein the discharge lamp is driven by an alternating current in the steady power lighting mode in which a first polarity and a second polarity are repeated by turns at a regular electric power lighting frequency selected from a range of 100 Hz-5 kHz, wherein the high pressure discharge lamp is driven at 50% or less of the alternating current in the low power lighting mode, wherein the alternating current comprises a first time unit and a second time unit that are repeated by turns so as to drive the discharge lamp, wherein the first time unit has a time width t1 and has one of the first and the second polarities, and wherein the first polarity and the second polarity are repeated in the second time unit by turns five times or more at intervals of a time width t2.

(2) In the high pressure discharge lamp lighting apparatus, the time width t1 is 20-500 ms (milliseconds) and the time width t2 of the second time unit is 0.01 ms-5 ms.

(3) In the high pressure discharge lamp lighting apparatus, when lighting in the low power lighting mode the alternating current has the second time unit is greater than the first time unit.

(4) The high pressure discharge lamp lighting apparatus is installed in a projector having a function of projecting an image.

(5) In the projector, wherein the steady power lighting mode shifts to the low power lighting mode when there is no change in an image signal of the projector for a fixed period.

(6) In the projector, the high pressure discharge lamp automatically turns off when there is no change in an image signal of the projector for a fixed period in the steady power lighting mode.

(7) In the projector, an operation is switched to the steady power lighting mode in conjunction with a detection unit after the operation is performed for a fixed period in the low power lighting mode.

According to the present invention, effects set forth below can be acquired.

(1) Since the lamp is lighted at an electric power value of 50% or less of the rated power consumption, wherein the rectangle wave alternating current comprises the first time unit and the second time unit, wherein the discharge lamp is driven by the alternating current in which the first and second time units are repeated by turns, and wherein the first time unit has the time width t1 and in the second time unit, the time width 2 is repeated five times or more, the arc luminescent spot of the discharge lamp is stabilized and the so-called flicker is prevented. Thus, the discharge lamp can be stably lighted at very low electric power without light-out of the discharge lamp.

(2) When the rectangle wave alternating current has the time width t1 of 20 ms-500 ms and the time width t2 of the second time unit of 0.01 ms-5 ms, deviation of the thermal load to an electrode is prevented, whereby position shifting of the projection of an electrode tip portion can be prevented, and even if it is operated over a long time at low electric power, the illumination life span characteristic is certainly secured.

(3) When the projector has the present high pressure discharge lamp lighting apparatus and when there is no change in an image signal of the projector for a fixed period while the discharge lamp is lighted at an electric power value of 50% or less of the rated power consumption, the mode is shifted to the low power lighting mode in which the discharge lamp is lighted at an electric power of 50% or less of the rated power consumption, so that it is possible to prevent a waste of electric power so that the electric power can be saved.

(4) When the projector has the present high pressure discharge lamp lighting apparatus and when there is no change in an image signal to be projected by the projector for a fixed period while the discharge lamp is lighted in the low power lighting mode in which the discharge lamp is lighted at an electric power of 50 or less of the rated power consumption, the discharge lamp is automatically turned off. Thus a failure of turning off the high pressure discharge lamp is prevented.

(5) When the projector has the present high pressure discharge lamp lighting apparatus and the projector is lighted in conjunction with a detection unit while the discharge lamp is lighted at an electric power value of less than 50% of the rated power consumption, it is possible to prevent a waste of electric power so that the electric power can be saved.

Figure 1:
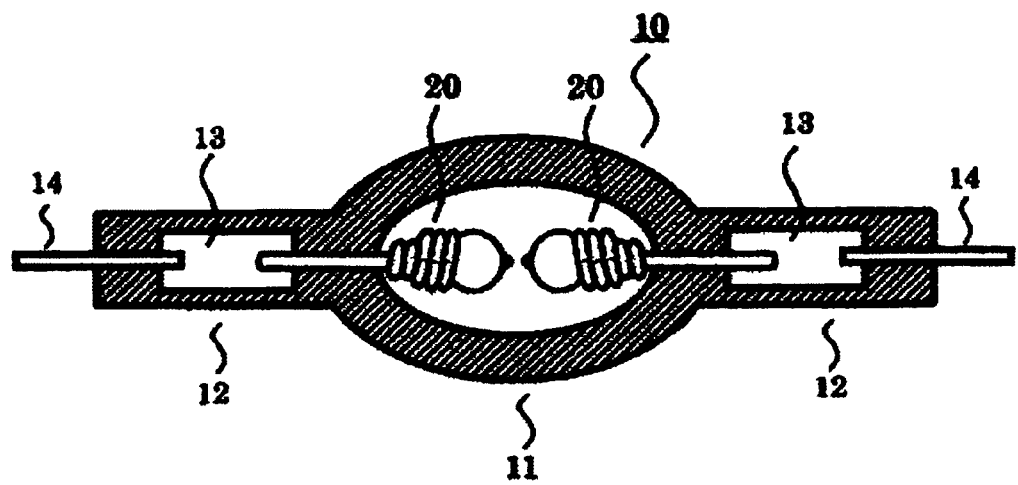
FIG. 1 is a diagram showing a high pressure discharge lamp of a high pressure discharge lamp lighting apparatus according to the present invention.

Description of embodiments of the present invention will be given below referring to drawings. FIG. 1 shows a high pressure discharge lamp according to the present invention. The high pressure discharge lamp 10 has an approximately spherical light emission section 11 that forms a silica glass electric discharge container. A pair of electrodes 20 is arranged in the light emission section 11 at an interval of 2 mm or less. In addition, sealing portions 12 are formed at both ends of the light emission section 11. A metallic foil 13 for electric conduction, which is made of molybdenum, is airtightly buried in each sealing portion 12 by, for example, shrink sealing. An axis portion of each of electrodes 20 joins to one end of the metallic foil 13, and an external lead 14 joins to the other end of the metallic foil 13 so that electric power is supplied from an external power supply apparatus. Mercury, rare gas, and halogen gas are enclosed in the light emission section 11. The mercury whose amount is 0.15 mg/mm$^3$ or more is enclosed to acquire radiation light with required visible light wavelength of, for example, 360-780 nm. Although the amount of enclosure differs depending on the temperature condition, the steam pressure becomes extremely high at 200 or more atmospheric pressure at the time of lighting. A discharge lamp, whose mercury vapor pressure is high, such as 250 or more atmospheric pressure or 300 atmospheric pressure or more at time of lighting, can be made by increasing the enclosed amount of the mercury further, whereby a light source suitable for a projector apparatus can be realized.

For example, argon gas whose amount is 13 kPa is enclosed as rare gas. The argon gas functions to improve a lamp's lighting starting nature. Iodine, bromine, chlorine, etc. are enclosed as the halogen in form of a compound with mercury or another metal. The enclosed amount of halogen is selected from a range of $1\times10^{-6}$ μmol/mm$^3$ to $1\times10^{-2}$ μmol/mm$^3$. Although a function of the halogen is to extend a life span by using the so-called halogen cycle, there is also a function of preventing devitrification of the electric discharge container, in cases where the discharge lamp is very small and the lighting vapor pressure thereof is very high, as in the high pressure discharge lamp of the present invention.

The specification (dimension etc.) of an embodiment of the high pressure discharge lamp is set forth below. For example, the maximum outer diameter of the light emission section is 9.4 mm, the distance between the electrodes is 1.0 mm, and the internal volume of the arc tube is 55 mm$^3$. Rated voltage applied thereto is 70 V, and rated power applied thereto is 180 W.

Moreover, this kind of discharge lamp is built in a projector apparatus for miniaturization purposes, in which while a severe miniaturization in an overall dimension. And a high intensity of light emission is required. For this reason, the thermal influence on the light emission section becomes very severe. A bulb wall load value of the lamp is 0.8-2.5 W/mm$^2$, specifically, 2.4 W/mm$^2$. When the discharge lamp having such a high mercury vapor pressure and bulb wall load value, is installed in an apparatus for presentation, such as a projector apparatus or an overhead projector, it is possible to provide radiation light with good color rendering properties.

Figure 2:
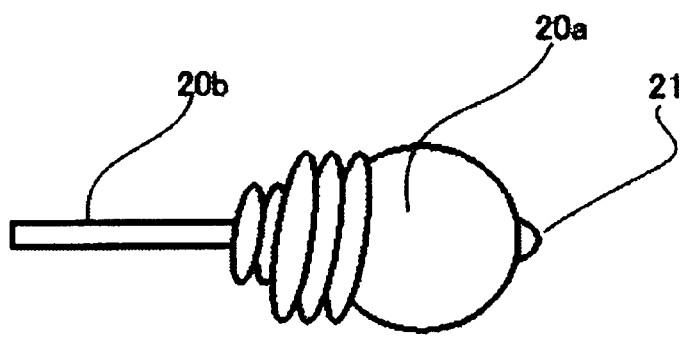
FIG. 2 is a diagram showing an electrode of a high pressure discharge lamp of a high pressure discharge lamp lighting apparatus according to the present invention.

FIG. 2 is a diagram of an electrode having a projection wherein the tip of the electrode 20 shown in FIG. 1 is schematically shown. Each of the electrodes 20 consists of a sphere section 20*a*, an axis portion 20*b*, and a projection 21 that is formed at the tip of the sphere section 20*a*. Here, the above-mentioned projection 21 becomes essential, when it is used as a light source of a projector apparatus in which a distance between electrodes is 2 mm or less, and mercury of 0.15 mg/mm$^3$ or more is contained in the light emission section as in the discharge lamp according to the present invention. This is because in the discharge lamp in which the mercury of 0.15 mg/mm$^3$ or more is contained in the light emission section and the pressure in an operation amounts to 200 or more atmospheric pressure, arc electric discharge is limited to a small size by the high vapor pressure, so that an electric discharge starting point is also limited to a small size. Moreover, since the arc electric discharge occurs from the projection, which serves as the starting point, when the projection 21 is formed at the tip of the electrode, light from the arc is hard to block by the sphere section 20*a* of the electrode. For this reason, the usage efficiency of light is improved, and a brighter image is obtained. Although FIG. 2 is a schematic diagram, there is usually an element corresponding to the spherical portion, which has a larger diameter than that of the axis, at the tip of the axis portion 20b.

Figure 5:
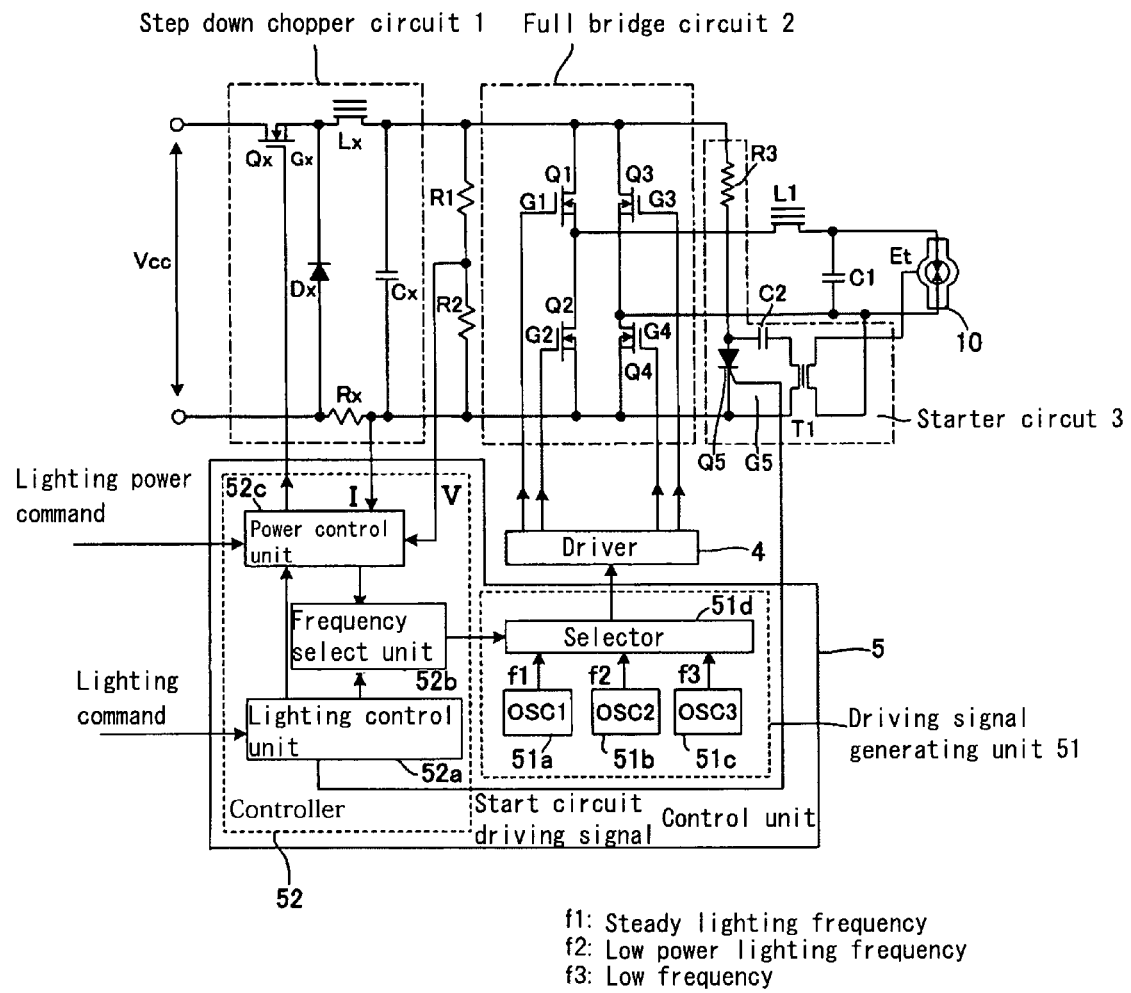
FIG. 5 is a diagram showing the structure of a high pressure discharge lamp lighting apparatus according to an embodiment of the present invention.

FIG. 5 shows a power supply apparatus for lighting the discharge lamp. The lighting apparatus has of the discharge lamp 10 and the power supply apparatus. The power supply apparatus has a step down chopper circuit 1 to which direct current voltage is supplied; a full bridge type inverter circuit 2 (hereinafter referred to as a "full bridge circuit"), which supplies to the discharge lamp 10 alternating current voltage converted from direct current voltage outputted from an output side of the step down chopper circuit 1; a coil L1 that is in series connected to the discharge lamp; a capacitor C1; a starter circuit 3; a driver 4 that drives switching elements Q1-Q4 of the full bridge circuit 2; and a control unit 5. The control unit 5 may be configured by a processing unit, such as a microprocessor. FIG. 5 shows a block diagram showing a functional structure.

In FIG. 5, the step down chopper circuit 1 comprises a switching element Qx that is connected to a plus terminal of a power supply to which the direct current voltage is supplied, a reactor Lx, a diode Dx whose cathode side is connected to a connecting point between the switching element Qx and the reactor Lx and whose anode side is connected to a minus terminal of the power supply; a smoothing capacitor Cx that is connected to an output side of the reactor Lx; and a resistor Rx for current detection, which is connected between the minus terminal of the smoothing capacitor Cx and the anode side of the diode Dx. By driving the switching element Qx at a predetermined duty ratio, an input direct current voltage Vcc is stepped down to a certain voltage according to the duty ratio. A series circuit of resistors R1 and R2 for voltage detection is provided in an output side of the step down chopper circuit 1. The full bridge circuit 2 includes the switching elements Q1-Q4 connected to form a bridge, in which the switching elements Q1 and Q4 and the switching elements Q2 and Q3 are turned ON by turns, so that square wave alternating voltage occurs between a contacting point of the switching elements Q1 and Q2 and a contacting point of the switching elements Q3 and Q4. The starter circuit 3 comprises a series circuit of a resistor R3, a switching element Q5, a capacitor C2, and a transformer T1. When the switching element Q5 is turned on, electric charges in the capacitor C2 are discharged through the switching element Q5 and a primary side coil of the transformer T1, so that a pulse-like high voltage occurs in a secondary side of the transformer T1. This high voltage is impressed to an auxiliary electrode Et of the discharge lamp 10, thereby turning on the lamp.

Figure 7:
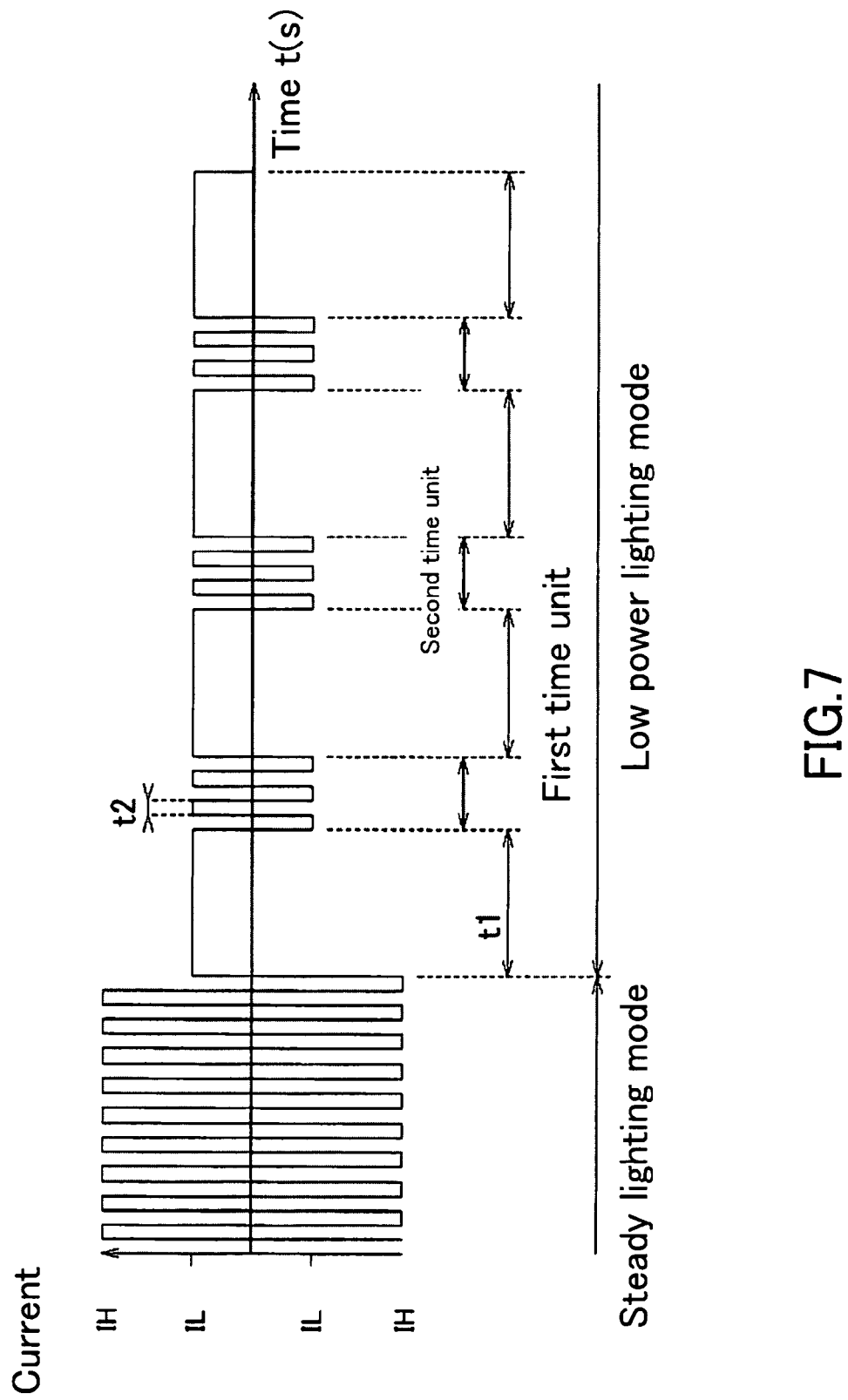
FIG. 7 is a diagram showing an example of a current waveform of a discharge lamp according to the present invention.

To operate the above circuit so that the first time unit has the time width t1 and in the second time unit, the time width 2 is repeated five times or more. A switching cycle of the switching elements Q1-Q4 of the full bridge circuit 2 are adjusted. Moreover, output voltage can be attained by adjusting the duty ratio in an operation of the switching element Qx of the step down chopper circuit 1. According to the duty ratio of a gate signal Gx, the switching element Qx of the step down chopper circuit 1 is turned on and off so that electric power, which is supplied to the lamp 10, is changed. That is, the gate signal Gx is controlled, so that if the electric power rises, the duty ratio of the switching element Qx is decreased, whereby the electric power may correspond to an electric power value of the inputted electric power adjustment signal. FIG. 7 shows a current waveform output.

The control unit 5 comprises a drive signal generating unit 51 and a controller 52. The drive signal generating unit 51 comprises, for example, alternating current signal generating units 51a and 51b; an asymmetrical rectangle wave signal generating unit 51c for generating a rectangular waveform in which the first time unit has the time width t1 and in the second time unit, the time width 2 is repeated five times or more so that the rectangular waveform is asymmetrical in a driving period; and a selector 51d which selects outputs. The drive signal generating unit 51 generates a drive signal for driving the switching elements Q1-Q4 of the full bridge circuit 2 by selectively outputting an output of the alternating current signal generating units 51a and 51b and the asymmetrical rectangle wave generating unit 51c. The controller 52 includes a lighting operation control unit 52a that controls a lighting operation of the lamp 10, and an electric power control unit 52c that controls lamp electric power, by driving the switching element Qx of the step down chopper circuit 1 at the set duty ratio according to a lighting power command from the outside. Moreover, to set up the drive signal of the switching elements Q1-Q4, the controller 5 has a frequency selection unit 52b that sends out a frequency selection command to the selector of the drive signal generating unit 51 according to a standby power lighting or a low power lighting that is operated by electric power of 0.5×P (W) or less.

The electric power control unit 52c obtains lamp current I from voltage between both ends of the resistor Rx for current detection, and lamp voltage V from voltage detected by the resistors R1 and R2 for voltage detection, whereby the lamp electric power is calculated, and the duty ratio of the switching element Qx of the step down chopper circuit 1 is controlled, so that the electric power is in agreement with (corresponds to) the lighting power command. The selector 51d selectively sends out an output of the alternating current signal generating units 51a-51b and the asymmetrical rectangle wave signal generating unit 51c to the driver 4 according to the command from the frequency selection unit 52b. In addition, according to an asymmetrical ratio increase and decrease signal that is outputted from the frequency selection unit 52b, the time width t1 of a rectangle waveform, which is outputted from the asymmetrical rectangle wave signal generating unit 51c, may be increased or decreased according to a value of the time width t2 of the second time unit. Furthermore, electric power of the discharge lamp lighting in the first time unit and electric power of the discharge lamp lighting in the second time unit may be changed so that the second time unit is greater than the first time unit. This will improve the temperature rise of the electrode projection portion, which is serving as an anode. When a lighting operation is shifted from the steady lighting to low power lighting, the electric power may be gradually reduced from the electric power of 50% or less of rated electric power consumption to the low power lighting, so that a rapid change of the electrode temperature can be further suppressed. In this case, it may be realized by shifting to the low power lighting while gradually reducing the electric power by controlling the duty ratio of the switching element Qx of the step down chopper circuit 1. Moreover, as described below, in cases where electric power in operation is gradually increased when shifting to the steady lighting from the low power lighting or when shifting to steady lighting while gradually shortening an anode driving period in a side of the electrode (changing Tb/Ta) that has performed an anode operation, the electric power supplied to the lamp is gradually increased by the electric power control unit 52c, or the asymmetrical rate of a rectangle waveform is controlled by the asymmetrical ratio increasing and decreasing signal sent out to the asymmetrical rectangle wave signal generating unit 51c.

Figure 6:
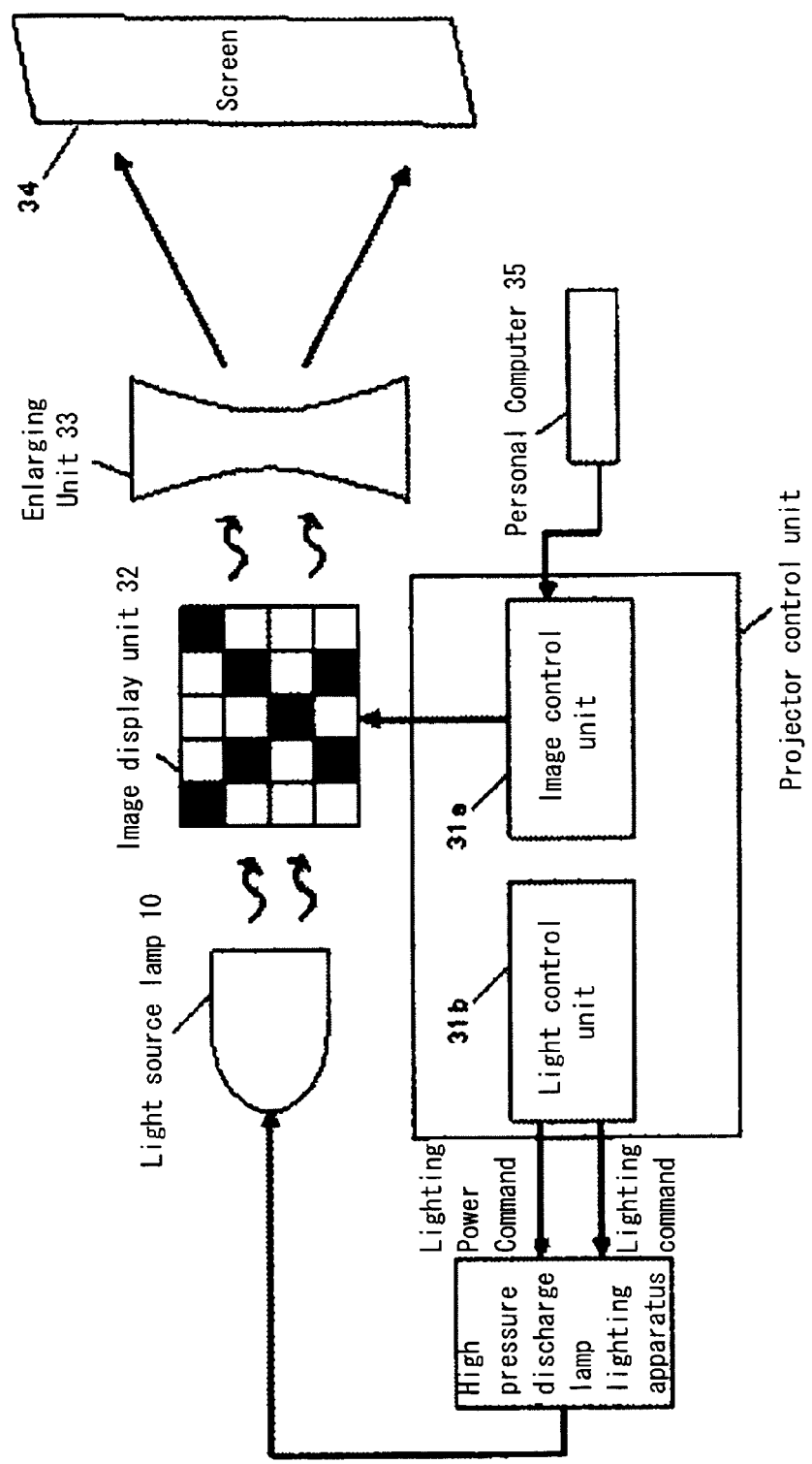
FIG. 6 is a diagram showing a configuration example of a projector which has a high pressure discharge lamp lighting apparatus according to an embodiment of the present invention.

FIG. 6 shows a configuration example of a projector in which the high pressure discharge lamp lighting apparatus according to the present embodiment is installed. The projector comprises the above mentioned high pressure discharge lamp lighting apparatus 30, the high pressure discharge lamp 10, a projector control unit 31, an image display unit 32 that is made up of a liquid crystal display apparatus, and an enlarging unit 33 that enlarges and displays an image displayed on the image display 32 in which the image enlarged by the enlarging unit 33 is projected onto a screen 32. The projector control unit 31 is equipped with an image control unit 31a that processes an image signal given from an external apparatus such as a personal computer 35 or a television, and a light control unit 31b that sends out a lighting command and a lighting power command to the above-mentioned high pressure discharge lamp lighting apparatus 30.

Next, description of the mode shifting control from the steady power lighting mode to the low power mode according to the present embodiment will be given below. The steady lighting mode means a mode of an operation performed by "rated power" and "modulated light power." In addition, although the lighting electric power in the "modulated light power" is determined by the design of the high pressure discharge lamp and the power supply apparatus, the "modulated light power" means an operation performed by approximately 60-80% of the "rated power". When the low power lighting mode is selected according to the lighting electric power command signal given to the control unit 5, the control unit 5 shown in FIG. 5 selects an asymmetrical rectangular waveform, which is a rectangular waveform in which the first time unit has the time width t1 and, in the second time unit, the time width 2 is repeated five times or more so that the rectangular waveform is asymmetrical in a driving period. That is, the frequency selection unit 52b makes the selector 51d select an output of the asymmetrical rectangle wave signal generating unit 51c, and then the driver 4 sends a driving signal of the asymmetrical rectangle waveform to the switching elements Q1-Q4, so that the switching elements Q1 and Q4, and the switching elements Q3 and Q2 are turned on by turns, in which on-time of the switching elements Q1 and Q4 and that of the switching elements Q3 and Q2 are asymmetrical (not the same), whereby the high pressure discharge lamp 10 performs an asymmetrical rectangle wave driving. Moreover, when by a lighting electric power command signal, a steady lighting mode is selected, a lighting operation is performed by rectangle wave alternating current lighting. That is, the frequency selection unit 52b makes the selector 51d select an output of the alternating current signal generating units 51a and 51b, and the driver 4 gives an alternating current drive signal to the switching elements Q1-Q4, so that the switching elements Q1 and Q4 and the switching elements Q3 and Q2 are turned on by turns, thereby supplying alternating current rectangle wave current to the high pressure discharge lamp 10.

Table 1 shows an actual evaluation result in the case where it is driven with the current waveform shown in FIG. 7. The condition of the lighting circuit is set forth below. The above-mentioned lamp of 180 W was used, wherein t1=50 ms, t2=0.1 ms, and t2 was repeated five times. The evaluation result is shown in Table 1.

In Table 1, electric power was changed in a range of 100 W-140 W in a low power lighting mode, and the existence of lighting at each electric power value, the electrode consumption, the existence of a flicker, and the existence of position shifting of a projection were examined. The standard of judgment in Table 1 will be described below. The symbol "⊙" shows that lighting could be performed and that there is no flicker, no wear of an electrode tip portion, and no position shifting of a projection. Thus, the operation was stably performed over a long time. The symbol "○" shows that lighting could be performed and that there is no flicker and no wear of an electrode tip portion, but there is a position shifting of a projection after a long time lighting operation. Thus, it was difficult to apply it to a lamp having a long life span, which requires illumination maintenance property over 4,000 hours. The symbol "x" shows that lighting could not be performed or that lighting could be performed but the electrode was so worn that it could not be normally used due to a phenomenon, such as a flicker.

As shown in Table 1, lighting could not be maintained in case of low electric power, which is 11% lower than the rated electric power. It is inferred that since the temperature of the electrode whose polarity was in a cathode side became extremely low, sufficient thermoelectronic emission could not be performed. Thus, it became impossible to maintain electric discharge, thereby becoming glow discharge, whereby it was detected as unusual voltage so that a protection circuit operated. Moreover, in case of the electric power, which is higher than 50% of the rated power, the projection disappeared since the temperature of the electrode whose polarity was in an anode side for a long time, was too high. For these reasons, only when electric power was selected from a range of 11-50% of the rated power according to the present invention was there no flicker, no disappearance of the projection at the tip of the electrode. and no light-out at time of shifting from the low power lighting mode to the steady power lighting mode. Thus, a good lighting state could be created.

TABLE 1

| Lighting power | Steady lighting power consumption | Light-out at time of lighting mode shifting | Lighting is performed or not | Wear of an electrode | Flicker | Position gap of a projection | Judgment |
| --- | --- | --- | --- | --- | --- | --- | --- |
| 10 W | 6% | X | X | — | — | — | X |
| 20 W | 11% | ○ | ○ | ○ | No | No | ⊙ |
| 30 W | 17% | ○ | ○ | ○ | No | No | ⊙ |
| 36 W | 20% | ○ | ○ | ○ | No | No | ⊙ |
| 40 W | 22% | ○ | ○ | ○ | No | No | ⊙ |
| 50 W | 28% | ○ | ○ | ○ | No | No | ⊙ |
| 60 W | 33% | ○ | ○ | ○ | No | No | ⊙ |
| 70 W | 39% | ○ | ○ | ○ | No | Yes | ○ |
| 80 W | 44% | ○ | ○ | ○ | No | Yes | ○ |
| 90 W | 50% | ○ | ○ | ○ | No | Yes | ○ |
| 100 W | 56% | ○ | ○ | X | No | Yes | X |
| 110 W | 61% | ○ | ○ | X | No | Yes | X |

TABLE 1-continued

| Lighting power | Steady lighting power consumption | Light-out at time of lighting mode shifting | Lighting is performed or not | Wear of an electrode | Flicker | Position gap of a projection | Judgment |
|---|---|---|---|---|---|---|---|
| 120 W | 67% | ○ | ○ | X | Yes | Yes | X |
| 130 W | 72% | ○ | ○ | X | Yes | Yes | X |
| 140 W | 78% | ○ | ○ | X | Yes | Yes | X |

Since it is necessary to supply asymmetrical rectangle waveform current to the lamp at time of the low power lighting, it is necessary to give a drive signal of an asymmetrical rectangle waveform to the switching elements Q1-Q4 of the full bridge circuit 2 shown in FIG. 5 to make a period for turning on the switching elements Q1 and Q4 asymmetrical and for the switching elements Q3 and Q2 by turns.

In an actual circuit configuration, for example, a high-level gate driving signal inputted to the switching elements Q1 and Q2 is generated by charging a capacitor. In this case, since the above-mentioned capacitor discharges, it is difficult to maintain the switching elements Q1 and Q3 at an ON state over a long time and charge the capacitor periodically. When the drive circuit having such a capacitor is used, the switching elements Q1 and Q3 are temporarily turned off in a period where the capacitor is charged, so that a periodic polarity-reversal operation is performed. The period where the capacitor is charged is approximately 0.1 ms, which depends on the capacity of the capacitor.

Therefore, the polarity reversal period, i.e., a drive period Tb, is desirably approximately 0.1 ms. If a direct current lighting driving is performed, a direct current driving signal is given to the switching elements Q1-Q4 of the full bridge circuit 2 shown in FIG. 5, wherein it is necessary to maintain the switching elements Q1 and Q4, or the switching elements Q3 and Q2 in the ON state.

Therefore, it is necessary to give a high level signal continuously to gates G1 and G4 of the switching elements Q1 and Q4, or gates G3 and G2 of the switching elements Q3 and Q2. In addition, it is necessary to impress, to the switching elements Q1 and Q3, a voltage as the gate driving signal that is higher level than that of the gate driving signal for the switching elements Q2 and Q4. Although the high level driving signal supplied to the gates G1 and G3 of the switching elements Q1 and Q3 may be generated by using a separate power supply, a charge pump circuit, etc., the number of parts will increase, thus increasing costs. Since the lamp is driven by a rectangle waveform in which the first time unit has the time width t1 and in the second time unit, the time width 2 is repeated five times or more, it is possible to configure a light circuit at low cost, without specially increasing the number of parts in an actual circuit configuration.

In general, an electrode, which is used for a high pressure discharge lamp, is mainly made of tungsten, and in order to improve an illuminance life characteristic, the tungsten whose purity is extremely high, i.e., 99.999% or more, is used. Although a long life span can be expected in the sense that the amount of impurities is small in the high purity tungsten, since a crystal grain becomes large, there is a drawback on which it is friable. Since, especially, a tip portion becomes extremely high in temperature, a crystal grain tends to become large. When thermal stress is rapidly applied thereto, a problem, in which cracks occur between crystal grains, arises. Therefore, when shifting to the steady power lighting, it is desirable that electric power be shifted after shifting to an alternating current driving.

By the control described above, for example, in a state where an image is projected on a screen face from a projector by an external signal inputted from a personal computer where there is no change in the screen it is possible to switch the mode to the low power lighting mode automatically, so that electric power can be saved. Furthermore, for example, if cooling of the high pressure mercury lamp is stopped while the mode is switched to the low power lighting mode, electric power can be further saved. Moreover, in an environment where lighting, which is short in time, is repeatedly performed, damages therein at start-up time sometimes adversely affect the life span of the high pressure discharge lamp. When the low power lighting mode is used, there are advantages that a life span characteristic is substantially improved by performing a continuous lighting operation without extinguishing the high pressure discharge lamp, and that an image can be projected on a screen instantly.

Although it is mainly described that in the low power lighting, an image is not projected on the screen, it is not limited thereto. That is, in a projection mode, to project a dark image more darkly on a screen, it is remarkably effective if it is operated by electric power, which is less than 50% of rated lighting electric power. In addition, the so-called improvement effects of a contrast ratio can be also expected.

The improvement of the contrast ratio mentioned above may be regarded as another effect of the low power lighting. When the contrast ratio is high, an image can be so sharply expressed, so that it is an important performance of such a projector together with the screen illuminance. For example, when a liquid crystal element is used as the image display unit, although depending on the performance of the liquid crystal element, the contrast ratio thereof is approximately 500:1 in general. Thus, the ratio of the illuminance of the screen face in case of projecting a white screen image to the illuminance of the screen face in case of projecting a black screen image is expressed as "500:1". For example, at time of black screen image projection, when the low power lighting is performed by electric power, which is 25% of the rated lighting, it becomes possible to substantially attain the contrast ratio of 2000:1. As mentioned above, actually since the light intensity decreases more than the power ratio as the working pressure decreases due to non-evaporated mercury, it is possible to realize the contrast ratio exceeding 2000:1.

Figure 8:
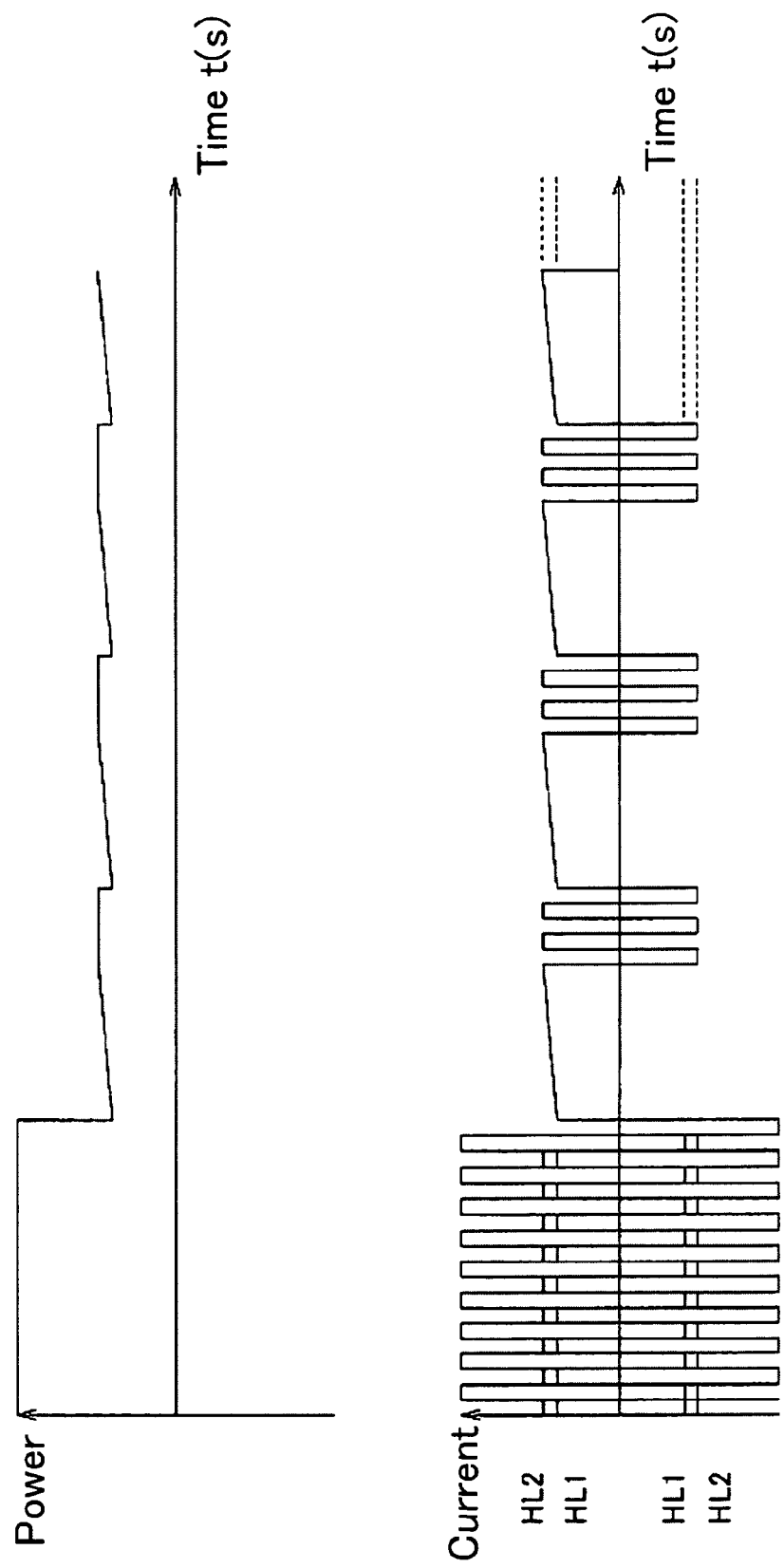
FIG. 8 is a diagram showing another example of a current waveform of a discharge lamp according to the present invention.
Figure 9:
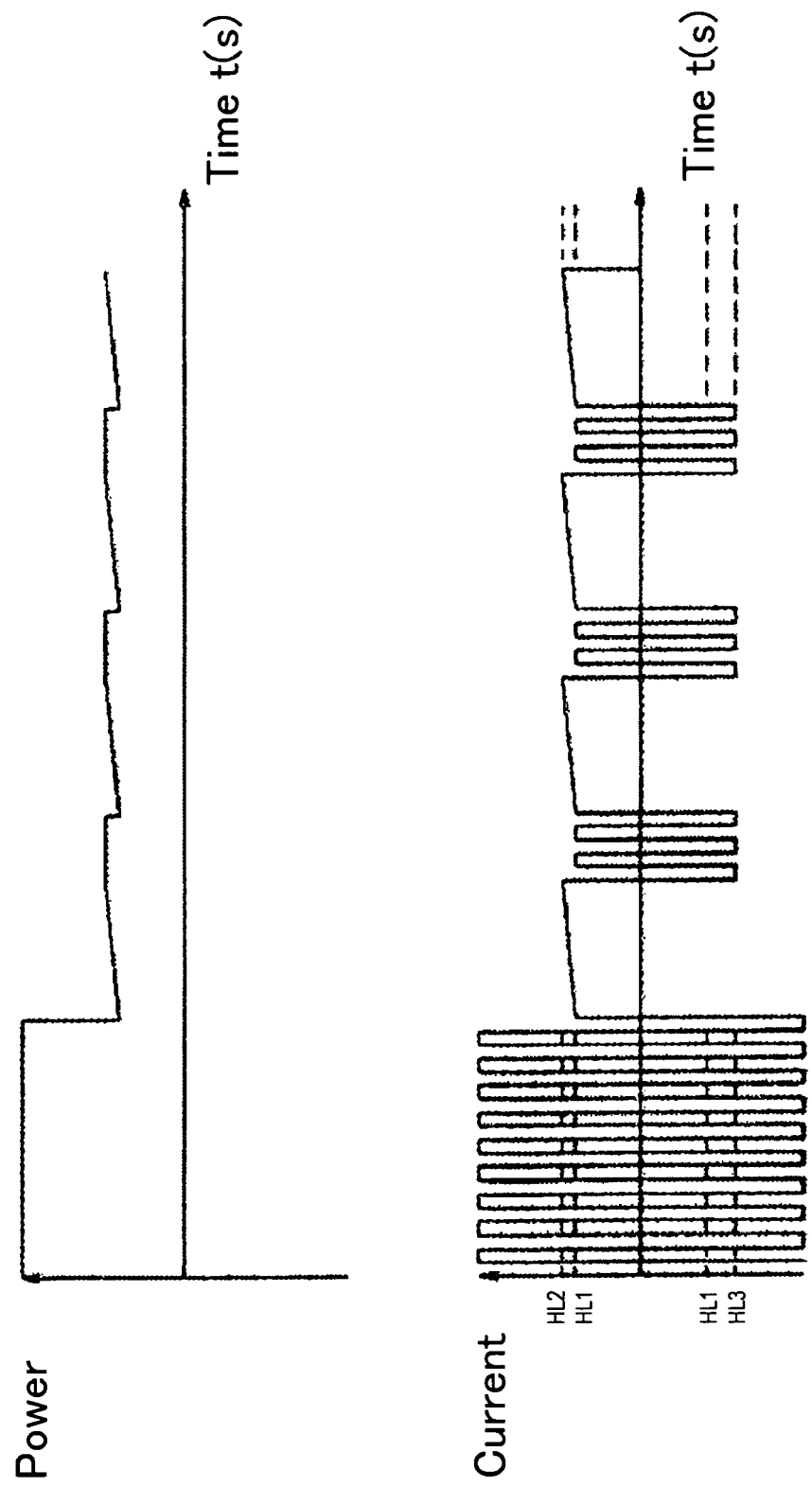
FIG. 9 is a diagram showing still another example of a current waveform of a discharge lamp according to the present invention.
Figure 10:
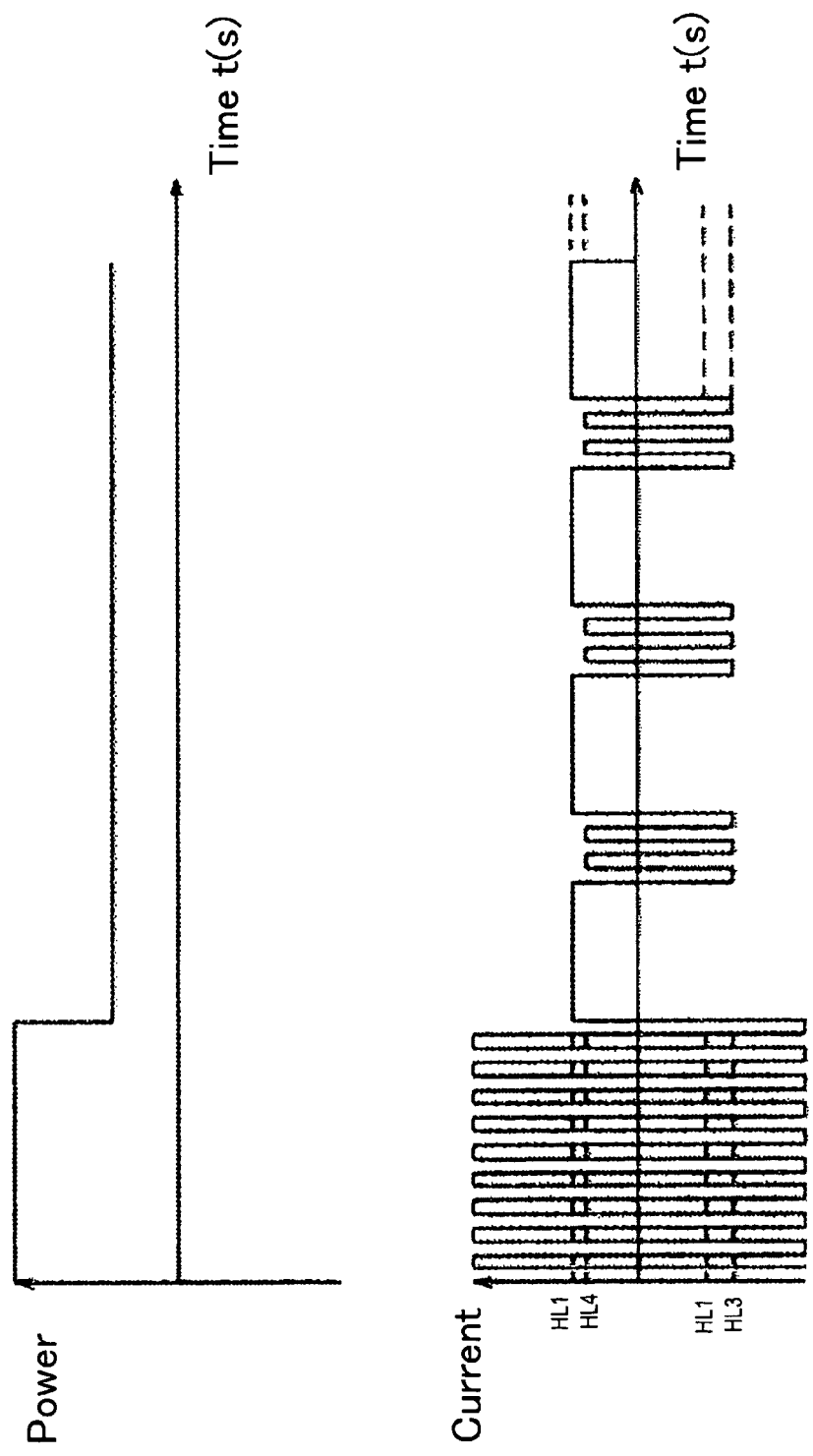
FIG. 10 is a diagram showing still another example of a current waveform of a discharge lamp according to the present invention.

FIGS. 8, 9, and 10 show other embodiments wherein the current at the time of lighting of the low power lighting mode has the relation where a second time unit is equal to or greater than a first time unit.

In the embodiment shown in FIG. 8, the operation is shifted to the second time unit without decreasing the temperature of a projection of an electrode that is performing a cathode operation in the first time unit. In the embodiment shown in FIG. 9, to raise the temperature of an electrode projection in which an anode operation is performing in the first time unit, the current of an anode side electrode is increased. In the embodiment shown in FIG. 10, electric power supplied in the first time unit and electric power supplied in the second time unit are the same, and the current is asymmetrical so that more current may flow through an electrode projection that is performing an anode operation in the first time unit. In addition, the electric power in the second time unit, which is increased here, is desirably set to the extent that a flicker does not occur on a screen of the projection apparatus.

Although in the above embodiments, the example of the liquid crystal element is shown as an image display unit, a DLP (digital light processor), which uses a DMD (digital mirror device) may be used. In general, a contrast ratio can be increased compared with such a projector, which uses the liquid crystal element in case of a DLP projector. However, it becomes possible to further improve the contrast ratio by combining it with the present invention.

The preceding description has been presented only to illustrate and describe exemplary embodiments of the present high pressure discharge lamp lighting apparatus and projector. It is not intended to be exhaustive or to limit the invention to any precise form. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A high pressure discharge lamp lighting apparatus, comprising:
    a high pressure discharge lamp comprising:
        a silica glass electric discharge container enclosing a first electrode arranged to face a second electrode at an interval of 2 mm or less, and
        0.15 mg/mm$^3$ or more of mercury, rare gas, and halogen in a range of $10^{-6}$ μmol/mm$^3$ to $10^{-2}$ μmol/mm$^3$; and
    a power supply apparatus that supplies a rectangle wave alternating current to the high pressure discharge lamp,
    wherein the high pressure discharge lamp has a steady power lighting mode and a low power lighting mode,
    wherein the discharge lamp is driven by an alternating current in the steady power lighting mode in which a first polarity and a second polarity are repeated by turns at a regular electric power lighting frequency selected from a range of 100 Hz-5 kHz,
    wherein the high pressure discharge lamp is driven at 50% or less of the alternating current in the low power lighting mode,
    wherein the alternating current comprises a first time unit and a second time unit that are repeated by turns so as to drive the discharge lamp,
    wherein the first time unit has a time width t1 and has one of the first and the second polarities, and
    wherein the second time unit has a time width t2 and the first polarity and the second polarity are repeated by turns five times or more at intervals of the time width t2.

2. The high pressure discharge lamp lighting apparatus according to claim 1, wherein the time width t1 is 20 ms-500 ms and the time width t2 is 0.01 ms-5 ms.

3. The high pressure discharge lamp lighting apparatus according to claim 1, wherein when lighting in the low power lighting mode the alternating current has the second time unit is greater than the first time unit.

4. A projector for projecting image, comprising the high pressure discharge lamp lighting apparatus according to claim 1.

5. The projector according to claim 4, wherein the steady power lighting mode shifts to the low power lighting mode when there is no change in an image signal of the projector for a fixed period.

6. The projector according to claim 4, wherein the high pressure discharge lamp automatically turns off when there is no change in an image signal of the projector for a fixed period in the steady power lighting mode.

7. The projector according to claim 4, wherein an operation is switched to the steady power lighting mode in conjunction with a detection unit after the operation is performed for a fixed period in the low power lighting mode.

* * * * *